United States Patent
Knueppel et al.

(10) Patent No.: US 7,324,900 B2
(45) Date of Patent: Jan. 29, 2008

(54) VEHICLE PASSENGER RESTRAINT SYSTEM WITH DISTRIBUTED SENSORS

(75) Inventors: Andreas Knueppel, Pontiac, MI (US); Tobias Tyroller, Regensburg (DE); Gerd Winkler, Regensburg (DE)

(73) Assignee: Siemens VDO Automotive Corporation, Auburn Hills, MI (US)

( * ) Notice: Subject to any disclaimer, the term of this patent is extended or adjusted under 35 U.S.C. 154(b) by 786 days.

(21) Appl. No.: 10/764,256

(22) Filed: Jan. 23, 2004

(65) Prior Publication Data
US 2004/0158376 A1   Aug. 12, 2004

Related U.S. Application Data

(60) Provisional application No. 60/411,969, filed on Jan. 23, 2003, provisional application No. 60/441,971, filed on Jan. 23, 2003, provisional application No. 60/441,970, filed on Jan. 23, 2003, provisional application No. 60/441,968, filed on Jan. 23, 2003.

(51) Int. Cl.
B60R 22/00   (2006.01)
B60R 21/16   (2006.01)

(52) U.S. Cl. .................. 702/45; 701/34; 280/728.1; 280/735

(58) Field of Classification Search .............. 701/31, 701/34, 35, 45, 46, 47; 280/728.1, 734, 735; 340/438
See application file for complete search history.

(56) References Cited

U.S. PATENT DOCUMENTS 5,040,118 A * 8/1991 Diller ..................... 701/45

(Continued)

FOREIGN PATENT DOCUMENTS

DE    100 49 911 A1   4/2002

(Continued)

OTHER PUBLICATIONS

International Search Report, Jun. 24, 2004,

Primary Examiner—Matthew Luu
(74) Attorney, Agent, or Firm—Carlson, Gaskey & Olds

(57) ABSTRACT

A distributed sensing system and method improves sensing of events that may require restraint deployment in a vehicle by distinguishing between deployment events and non-deployment events using data from more than one sensor.

A transmission check process continuously monitors an incoming signal from a sensor and counts the number of data samples that exceed a selected value using a counter. If the counter value exceeds a selected threshold, the system indicates that the transmission check is fulfilled and allows deployment of the restraint.

A correlation acceleration difference (CAD) algorithm calculates a CAD term corresponding to a degree of intrusion of a foreign object into a vehicle at a given time. Acceleration data from sensors disposed at supporting sides of the vehicle are checked if they respond to an event, and the absolute values of the acceleration data are subtracted from each other to obtain an absolute difference from which the CAD term is calculated.

A method of reducing runtime in a system algorithm prioritizes calculations so that they are conducted on the side having the higher likelihood of having conditions requiring restraint deployment. Prioritizing calculations may also avoid refiring on a side that has already deployed a restraint, reducing the total number of calculations that the system needs to conduct.

A method of evaluating a plausibility that a fire decision from a given sensor is the result of an event necessitating deployment of a restraint includes a plausibility check that checking the states of other sensors in the system before issuing a restraint firing request. The specific terms used in the plausibility check can be adjusted to accommodate different vehicle hardware configurations, vehicle setups and requirements.

8 Claims, 10 Drawing Sheets

U.S. PATENT DOCUMENTS 6,341,252 B1 * 1/2002 Foo et al. ............. 701/45
6,460,882 B1   10/2002 Andres
6,487,482 B1   11/2002 Mattes et al.
6,980,097 B2 * 12/2005 Bullinger et al. ........... 340/438

FOREIGN PATENT DOCUMENTS

| DE | 100 62 427 A1 | 7/2002 |
| WO | WO 02/12029 A1 | 2/2002 |
| WO | WO 02/34579 A1 | 5/2002 |
| WO | WO 02/42123 A1 | 5/2002 |

* cited by examiner

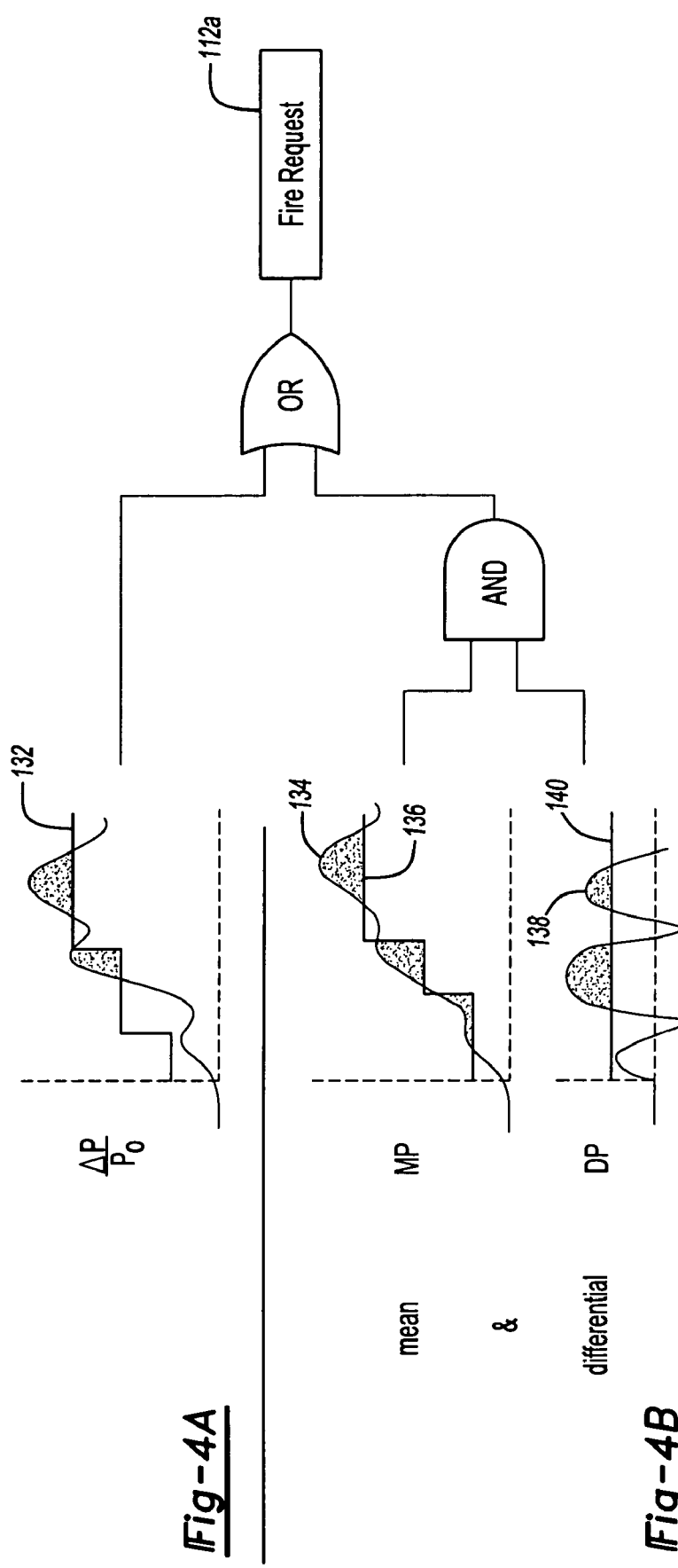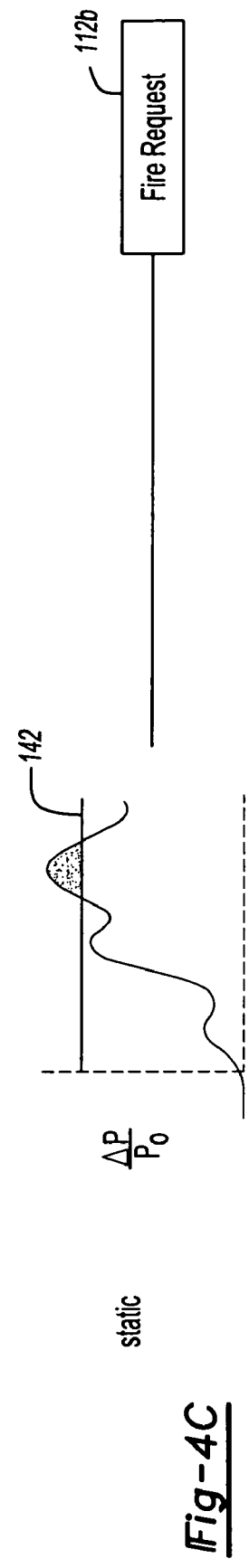
Fig-4A
Fig-4B  mean & differential
Fig-4C  static

VEHICLE PASSENGER RESTRAINT SYSTEM WITH DISTRIBUTED SENSORS

REFERENCE TO RELATED APPLICATIONS

This application claims the benefit of U.S. Provisional Appln. 60/441,969, U.S. Provisional Appln. 60/441,971, U.S. Provisional Appln. 60/441,970, and U.S. Provisional Appln. 60/441,968, all filed on Jan. 23, 2003.

TECHNICAL FIELD

The present invention relates to vehicle passenger restraint systems, and more particularly to a system and method for determining whether to deploy a restraint.

BACKGROUND OF THE INVENTION

Vehicle passenger restraint systems include one or more sensors that detect events that may require deployment of a restraint. Currently known sensor systems incorporate localized sensors, which each may include an acceleration sensor and a signal measurement and filtering device. Each localized sensor also includes a processor that evaluates the acceleration sensor output according to an algorithm to determine whether the output reflects a crash or other event requiring restraint deployment. If so, the module initiates a fire request to deploy a restraint. The restraint itself can be any type of restraint, such as an airbag.

Although localized sensors are able to detect events that may warrant restraint deployment, a given localized sensor is unable to detect events occurring at other vehicle locations. The sensor therefore makes its firing decision based solely on information that it obtains from one limited area of the vehicle. It is therefore possible for a restraint to be deployed even if the event detected by the sensor does not warrant deployment. Without data from any other points in the vehicle, there is no way for the localized sensor to evaluate the plausibility that a given fire request is actually due to a crash. Further, there is no way to confirm a crash occurrence from a single localized sensor.

There is a desire for a restraint system that improves confidence in a decision to deploy a restraint.

SUMMARY OF THE INVENTION

The present invention is generally directed to a distributed sensing system for sensing an event that may trigger deployment of a restraint. The distributed sensing system improves sensing of events that may require restraint deployment by distinguishing between deployment events and non-deployment events using data from more than one sensor.

One embodiment of the invention is directed to a method and system that reduces the likelihood of inadvertent restraint deployment due to undetectable transmission failures in a distributed sensing system. In one example, the system checks a selected number of data samples and tracks the number of data samples that exceed a selected value using a counter. If the counter value exceeds a selected threshold, the system indicates that the transmission check is fulfilled and allows deployment of the restraint. The transmission check process ensures that a restraint will not be deployed unless the deployment signal meets transmission check requirements, reducing the risk of deployment due to transmission failures.

Another embodiment of the invention is directed to a distributed sensing system and method that calculates a correlation acceleration difference (CAD) corresponding to a degree of intrusion of a foreign object into a vehicle at a given time. The CAD is calculated from different sensors within the system. In one example, acceleration data from sensors disposed at supporting sides, such as opposite sides, of the vehicle are checked if they respond to an event, and the absolute values of the acceleration data are subtracted from each other to obtain an absolute difference. The absolute difference is then integrated to obtain the CAD term by removing time influence in the signal. The value of the absolute difference provides information that can be used to discriminate the nature of the object intrusion from other types of events. In one embodiment, the integration may be conducted using an offset that can be adjusted to control the use of the CAD term; the higher the offset, the sooner the CAD term goes back to zero.

Yet another embodiment of the invention is directed to a method of reducing runtime in an algorithm used in a restraint system having a distributed sensing system with raw data transmission. In one example, a controller in the restraint system switches between symmetrical calculations on each side of the restraint system. The system reduces the runtime by prioritizing algorithm executions so that they are conducted on the side having the higher likelihood of having conditions requiring restraint deployment. Prioritizing calculations may also avoid refiring on a side that has already deployed a restraint, reducing the total number of calculations that the system needs to conduct.

Another embodiment of the invention is directed to a distributed sensing system and method that evaluates the plausibility that a fire decision from a given sensor is the result of an event necessitating deployment of a restraint. A parameterable plausibility path allows evaluation of a given sensor response with respect to one or more parameters to determined whether the response is consistent with a deployment-worthy event. In one example, the sensor generating a fire signal conducts a plausibility check by checking the states of one or more other sensors in the system with respect to one or more selected fixed parameters. The specific parameters used in the plausibility check can be adjusted to accommodate different vehicle hardware configurations, vehicle setups and requirements. The invention therefore improves restraint deployment discrimination by providing additional degrees of freedom for the deployment decision in the plausibility check, ensuring that the ultimate deployment decision is not based on an output from a single sensor.

By evaluating multiple sensors at different vehicle locations in making the ultimate deployment decision, the inventive system and method improves the accuracy of a deployment decision while optimizing system resources for running the algorithms.

BRIEF DESCRIPTION OF THE DRAWINGS

FIGS. 4A, 4B, and 4C are graphical examples of a first event discrimination mode using a pressure sensor;

DETAILED DESCRIPTION OF THE EMBODIMENTS

Figure 1:
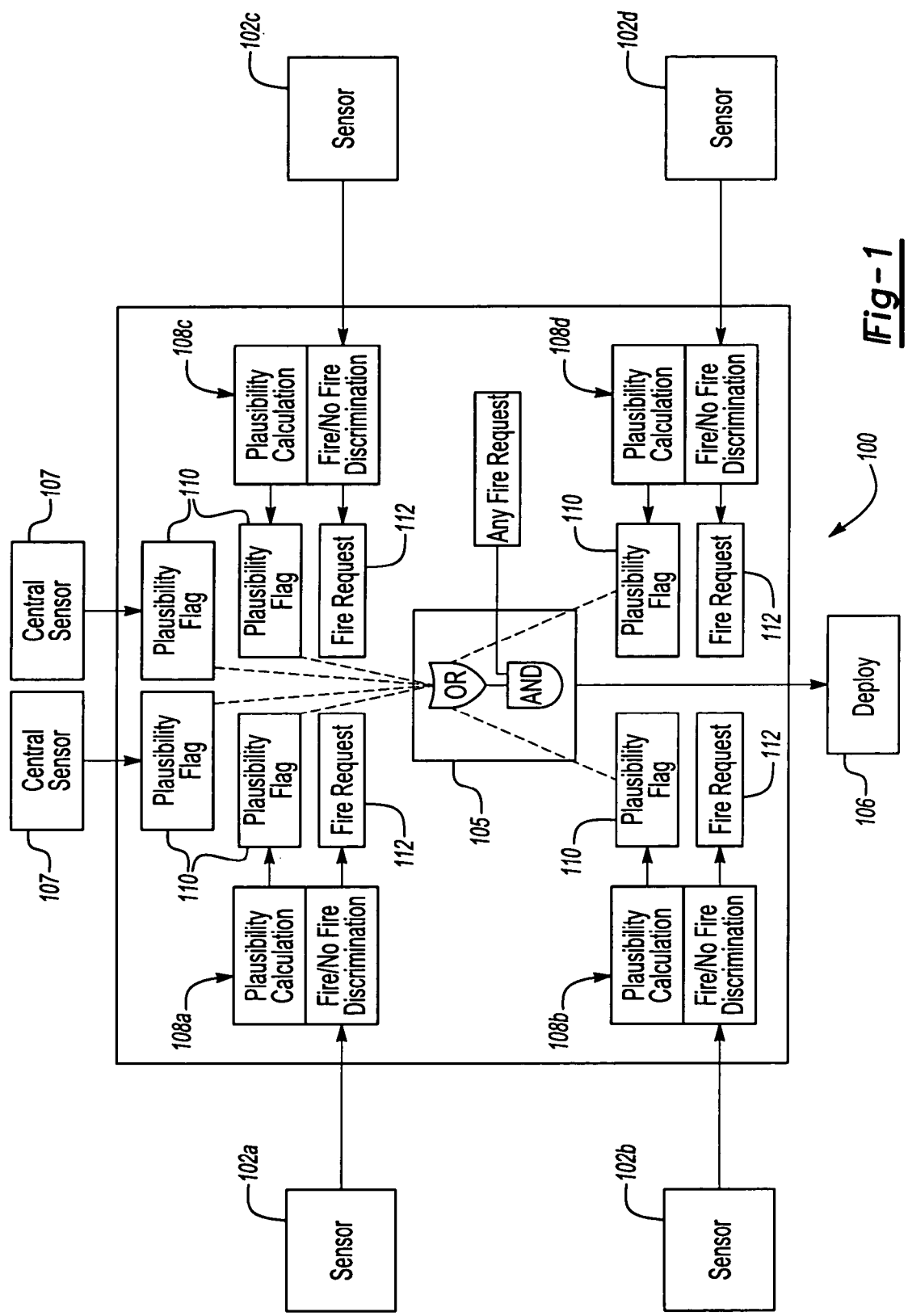
FIG. 1 is a representative diagram of a distributed sensor system according to one embodiment of the invention.

The invention is generally directed to a distributed sensor system 100 for a vehicle 101. The system 100 includes a plurality of sensors 102a, 102b, 102c, 102d at various locations in the vehicle. The sensors 102 may be any appropriate type of sensor, such as an acceleration sensor or an air pressure sensor, to determine whether to deploy one or more restraints (not shown), such as airbags, in the vehicle. Note that different types of sensors 102 can be used in the same system 100. Further, the sensor arrangement may be arranged symmetrically with respect to the driver and passenger sides of the vehicle, if desired. For example, sensors may be arranged in rows, where the sensors in each row are the same type and have the same sensing range. The specific type of sensor 102 used at any given location and/or in a given vehicle depends on, for example, the system configuration, desired system response, and/or the individual characteristics of a given vehicle platform.

In one embodiment, a central controller 105 is incorporated to receive raw data from the sensors 102 and decide whether to deploy a restraint by sending a fire signal to a deployment device 106 based on the raw data. By generating the fire signal in the controller 105 rather than in the individual sensors 102, the distributed sensing system 100 can make firing decisions based on data from multiple sensors rather than a single sensor 102. The controller 105 may consider data from front impact sensors 107 as well as the side impact sensors 102 to improve event discrimination even further. Note that the distributed sensing system 100 can evaluate data from sensors of any kind and any location and is not limited to those described.

In the illustrated embodiment, the controller 105 includes a sensor module 108a, 108b, 108c, 108d associated with each sensor 102a–d. Each sensor 102 sends raw data to its corresponding sensor module 108 so that it can be evaluated with respect to various criteria, several of which will be described in greater detail below. The modules 108 in the controller 105 may compare, add, subtract, or otherwise analyze outputs from the sensors 102 to enhance confidence in the final deployment decision.

In one embodiment, each sensor module 108 may set a plausibility flag 110 and/or generate a fire request 112 based on the raw data received from its corresponding sensor 102. This information is used by the controller 105 in determining whether to send the firing signal. If the controller 105 determines from its modules 108 that the raw data from the sensors 102 reflect the occurrence of a crash or other event warranting restraint deployment, the controller 105 sends the fire signal to the deployment device 106 to deploy the appropriate restraint in response to the data.

Checking more than one sensor 102 improves confidence in the system's ultimate deployment decisions and ensures that restraints are deployed only when they are truly needed. In the examples described below, it is assumed that valid sensor data is used by each sensor module 108 in its calculations. If any one of the sensors 102 is outputting invalid sensor data (e.g., if a module receives sensor data having its diagnostic flag set to 1), the sensor module 108 receiving the invalid data performs its calculations during that cycle with a default value for the defective sensor 102 to avoid making a deployment decision based on the erroneous data. The default value is, for example, zero so that the influence of the defective sensor 102 on the output is zero as well. Note, however, that the sensor module 108 will continue to run its algorithm even when the error is detected because the error may be temporary and disappear in the next cycle.

By moving the deployment decision away from the individual sensors 102 and into a centralized controller 105, the inventive distributed sensing system 100 improves the confidence in a given restraint deployment decision by basing the decision on data from multiple sensors rather than a single sensor. This centralized decision-making leads to several system features that can be incorporated in the distributed sensing system 100.

Fire/No-fire Discrimination

Figure 2:
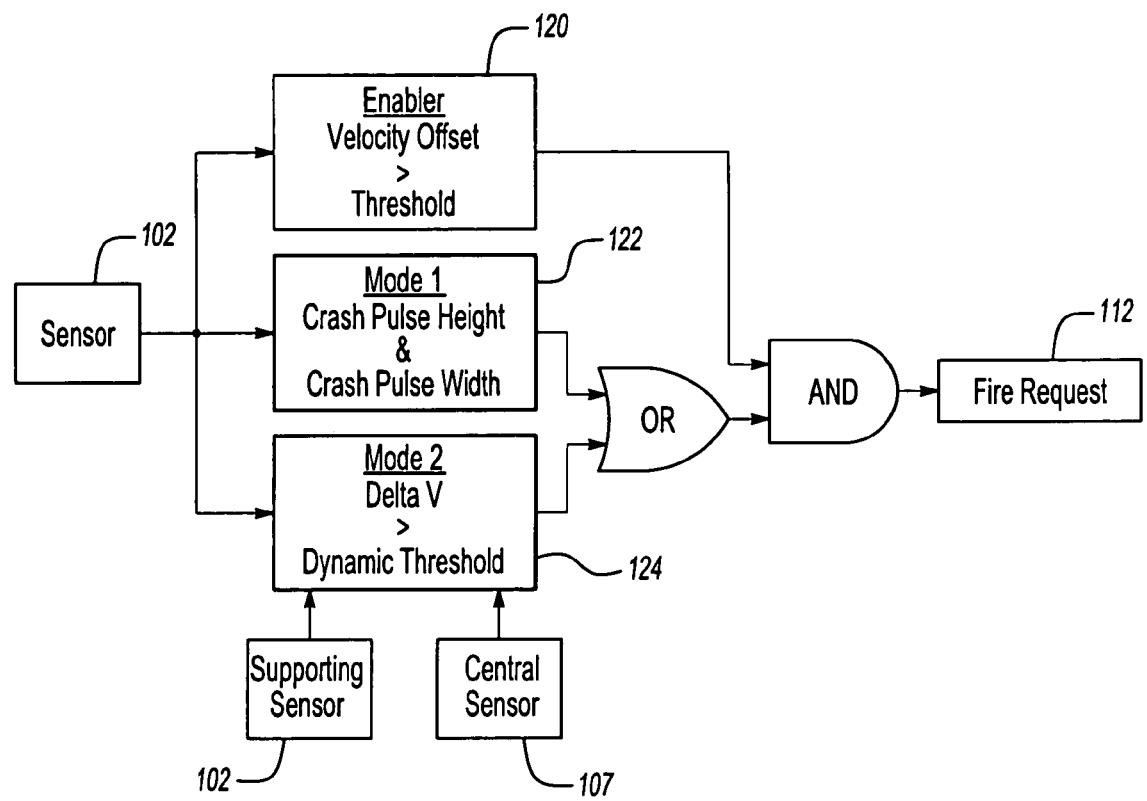
FIG. 2 is a representative diagram of a fire/no-fire discrimination system according to one embodiment of the invention.

FIG. 2 illustrates a fire/no-fire discrimination algorithm 118 in which the modules 108 may decide whether to generate a fire request 112 based on acceleration signals. In the illustrated embodiment, each module 108 may make its decision based on one of two modes. When a module 108 receives raw data from its corresponding sensor 102, the module 108 checks whether the data reflects a velocity offset that is greater than a threshold to enable fire/no-fire discrimination 120, which indicates structural movement of the car at the same time as the decision to fire. The module 108 also evaluates the raw data according to two possible modes 122, 124. The first mode 122 evaluates a pulse height and width from the raw sensor data according to a fixed or dynamic threshold, while the second mode 124 checks whether an energy level $\Delta V$ (i.e., a change in velocity) exceeds a dynamic threshold that changes based on various terms, which will be described in greater detail below. In one embodiment, the energy level $\Delta V$ is an integral of the acceleration signal generated by the sensor 102 that is filtered to offset the effects of normal vehicle operation on the signal. The energy level $\Delta V$ may be calculated using, for example, a finite impulse response (FIR) filter having an adjustable/calibratable length.

In one embodiment, the first mode 122 is active at the beginning of an event and ends when a selected energy level is present for a predetermined time period, while the second mode 124 is active after the selected energy level is present for a predetermined time period. This ensures that the first mode 122 can discriminate an event quickly at the start of the event based on a single sensor output while the second mode 124 can discriminate over an extended time period based on multiple sensor outputs as the event progresses.

Figure 3A:
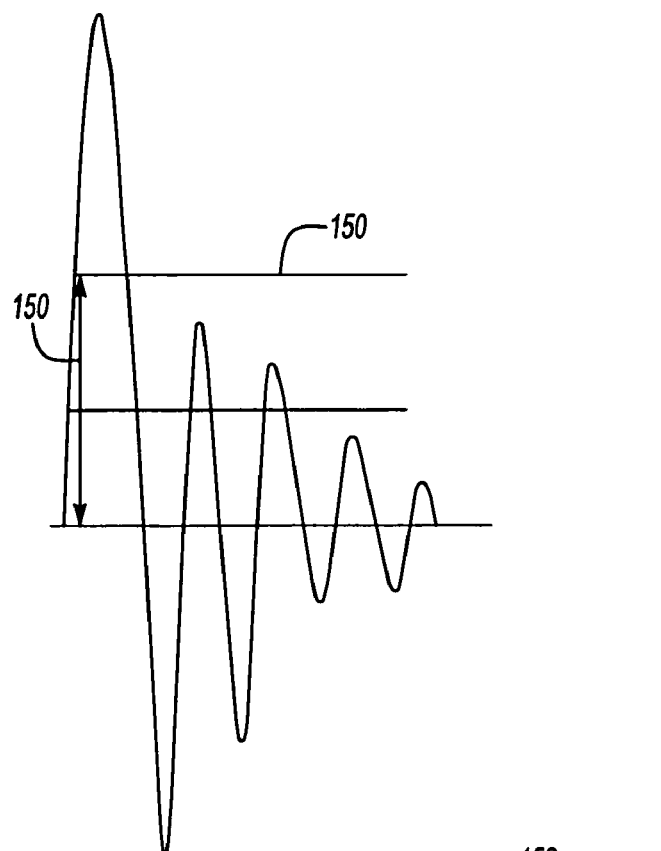
FIGS. 3A, 3B and 3C are graphical examples of a first event discrimination mode using an acceleration sensor.
Figure 3B:
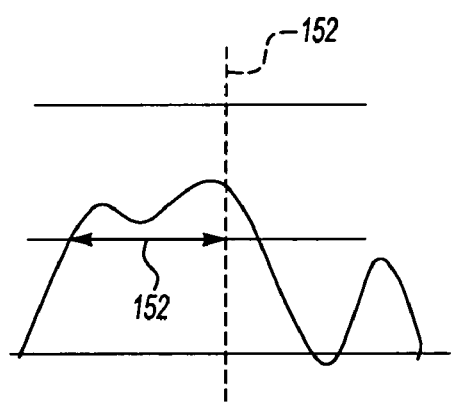
Figure 3C:
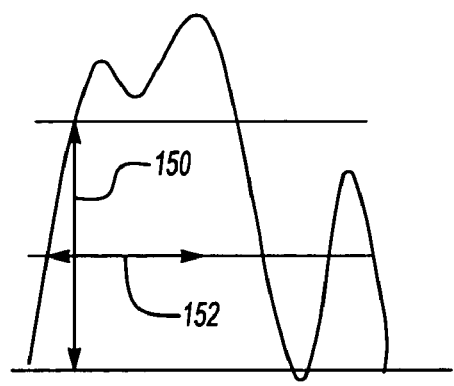

FIGS. 3A, 3B and 3C are examples of acceleration sensor responses used by the modules 108 to discriminate among events and detect an event warranting a fire request 112 according to the first mode 122. These examples are for illustrative purposes only and are not meant to be limiting. Generally, a given sensor module 108 will send a fire request 112 if its corresponding acceleration sensor 102 outputs a pulse that is both high and wide, indicating that the vehicle acceleration at that portion of the vehicle is changing rapidly for an extended period of time.

FIG. 3A illustrates an example where the sensor 102 detects a sharp change of short duration (e.g., an intense, quick blow to the vehicle body). In this example, the resulting acceleration sensor pulse is high, reaching above a height threshold 150, but narrow, indicating that the event causing the spike in the sensor response is not severe and/or not crash-relevant. Because the width of the pulse is smaller than a width threshold 154, the fire/no-fire discrimination algorithm 118 in the sensor module 108 does not generate a fire request 112. Similarly, FIG. 3B illustrates an example where the acceleration sensor generates a pulse that is wide (reaching the width threshold 154), but low, indicating that the event is a relatively slow, low-intensity impact on the vehicle (e.g., a bump in the road) that is too mild to warrant restraint deployment.

If, however, the acceleration sensor 102 outputs a pulse that exceeds both the height and width thresholds 150, 152 set by the sensor module 108 (FIG. 3C), the fire/no-fire discrimination algorithm 152 will interpret the raw data from the sensor 102 as reflecting an event warranting restraint deployment. The sensor module 108 will therefore generate a fire request 112 corresponding to its associated sensor 102.

FIGS. 4A, 4B, and 4C are examples of air pressure sensor responses used by the modules 108 to discriminate among events and detect an event warranting a fire request according to the first mode 122. Like the previous examples, these examples are for illustrative purposes only and are not meant to be limiting. In this example, the pressure sensor responses may control the operation of two different fire requests 112a, 112b, both of which are associated with responding to a side crash event. In this example, if a front crash event and a side crash event occur at the same time, only the fire request 112b is allowed to fire. This is to prevent a pressure rise caused by deployment of a front air bag from triggering deployment of a side restraint.

Pressure sensors may be disposed in, for example, the vehicle door or the front of the vehicle body to detect changes in air pressure caused by impact. FIG. 4A illustrates a relative air pressure change $\Delta P/P_0$ using a dynamic pressure threshold 132. The threshold 132 can change based on, for example, the detected air pressure changes. If the relative pressure change $\Delta P/P_0$ exceeds the dynamic threshold 132, the module 108 generates the fire request. This example is often used to detect collisions between an object and one of the vehicle doors.

FIG. 4B illustrates an example that checks a mean pressure with respect to a dynamic pressure threshold 136 and a differential pressure 138 with respect to a fixed threshold 140. If either the mean pressure 134, the differential pressure 138, or both exceed their respective thresholds, the module 108 generates the fire request. Although FIG. 4B shows an AND operator that evaluates the mean pressure 134 and differential pressure 138, the system is calibratable to generate the fire request even if only one of the two pressure terms 134, 138 exceeds its corresponding threshold, depending on the desired system operation. This example is often used to detect collisions between an object and a B-pillar in the vehicle or an angled collision between vehicles.

FIG. 4C illustrates an example comparing the relative pressure change $\Delta P/P_0$ with respect to a fixed threshold 142. This example is often used to detect collisions warranting deployment of a front airbag. The threshold 142 in this example is desirably set at a high enough level so that it will not generate a fire request due to air pressure changes within the vehicle caused by deployment of a front airbag while still being low enough to detect and discriminate a high speed side impact event.

Note that regardless of the specific sensor 102 used to discriminate among events, a fire request from one sensor module 108 does not automatically send a fire signal to the deployment device 106. Instead, the raw data from the sensor 102 may be further evaluated, either alone or with respect to each other, before determining whether to ultimately send the fire signal to the deployment device 106. Further, depending on which sensors are generating outputs falling above the selected thresholds, the specific fire request 112a, 112b that is generated can vary depending on which restraint constitutes the most appropriate response. For example, the detection method shown in FIGS. 4A and 4B tends to be sensitive, making it desirable to ignore the fire request 112a if a front air bag inflation is detected within a selected time window of the request 112a (e.g., within 50 ms). This ensures that air pressure changes caused by the front air bag inflation will not trigger the fire request 112a. The detection method shown in FIG. 4C, on the other hand, may be kept independent of any detected front air bag deployment because its high threshold makes it unlikely that the air pressure changes caused by front air bag deployment will be high enough to trigger the fire request 112b. The fire/no-fire discrimination may be supported by other sensor signals such that the deployment 106 is based on at least two different sensor signals.

Figure 5:
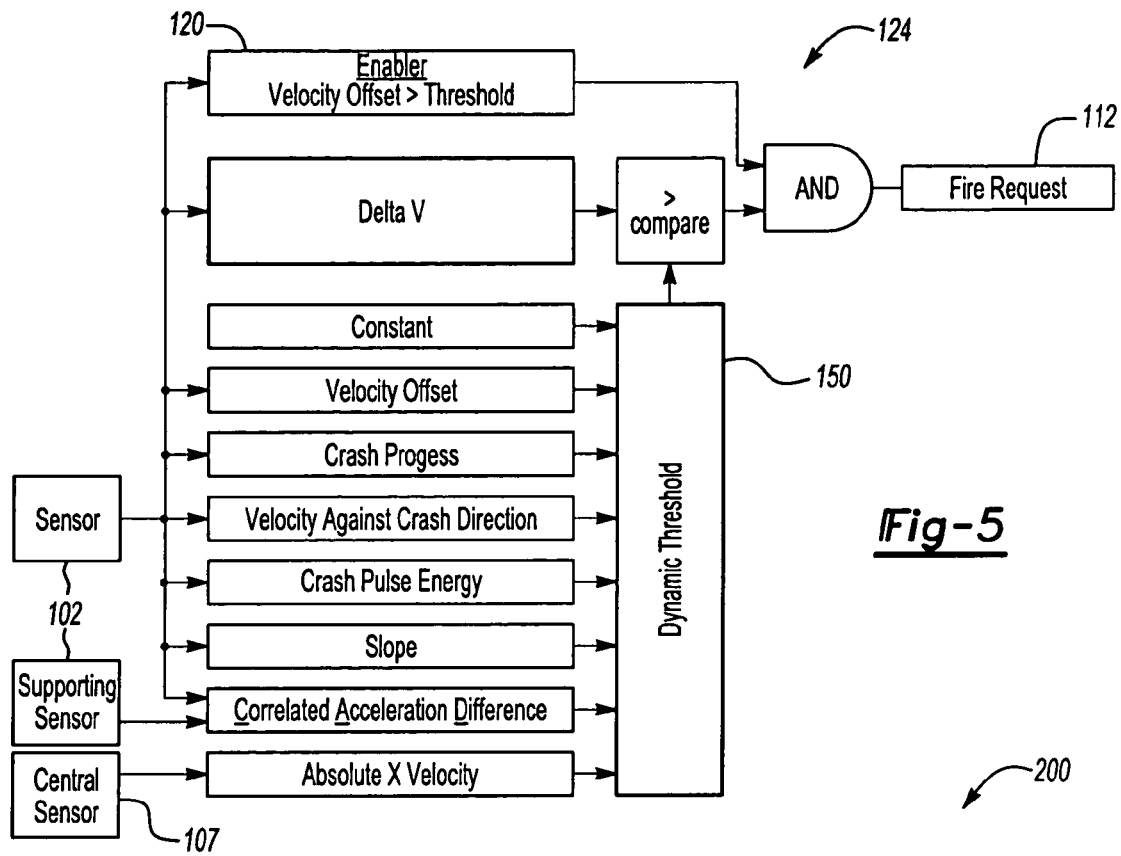
FIG. 5 is a representative diagram of a second event discrimination mode.

FIG. 5 is a representative diagram of the second discrimination mode 124, which is used to evaluate outputs from acceleration sensors. Note that the second mode 124 in this example considers not only an output from the sensor 102 corresponding to the module 108, but also a supporting sensor, such as a sensor on the opposite side of the vehicle, as well as a central sensor 107. Generally, a dynamic threshold 150 at which the energy level is deemed to warrant a fire request 112 may change based on various terms as well as the overall sensor response within a given time window. The relative weighting of the terms and their effect of the dynamic threshold 150 can be varied based on how the detected event is progressing over time. For example, if the terms indicate a higher likelihood that the sensor 102 response is due to a crash, the module 108 may change the dynamic threshold 150 so that the energy level $\Delta V$ is more likely to cross the threshold 150 sooner, thereby making the module 108 more sensitive.

In addition to the terms shown in FIG. 5, there are various methods to improve the confidence in a decision to send a fire signal to the deployment device 106. Several of these methods are described in greater detail below.

Signal Transmission Check

Figure 6:
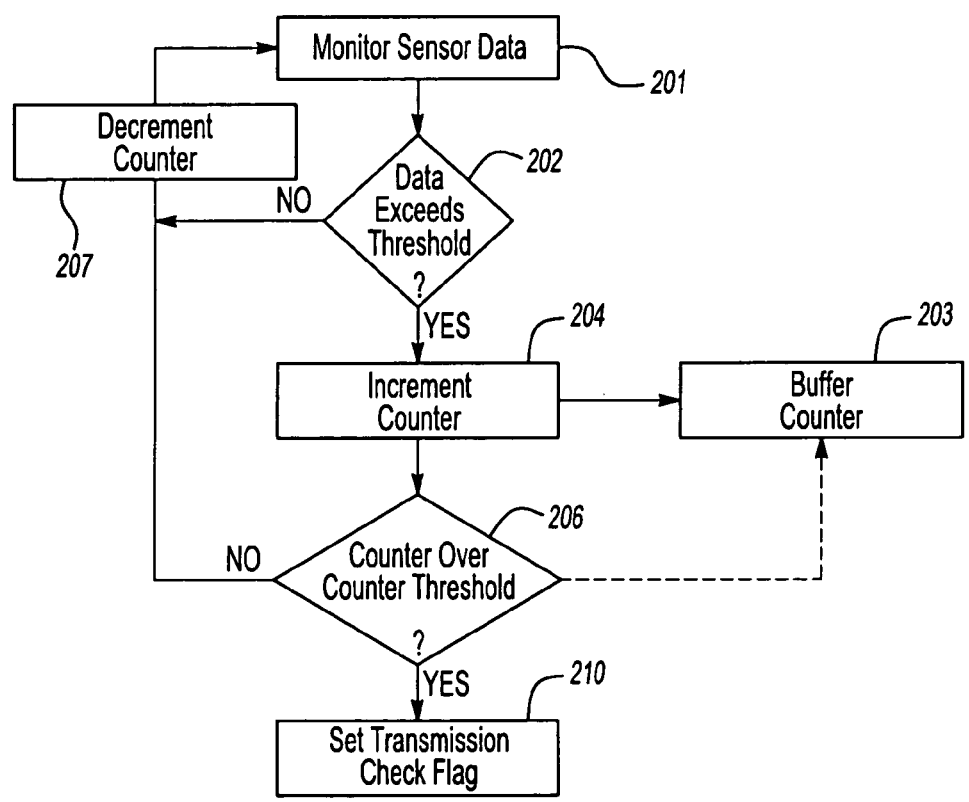
FIG. 6 is a flow diagram of a transmission check process according to one embodiment of the invention.
Figure 7:
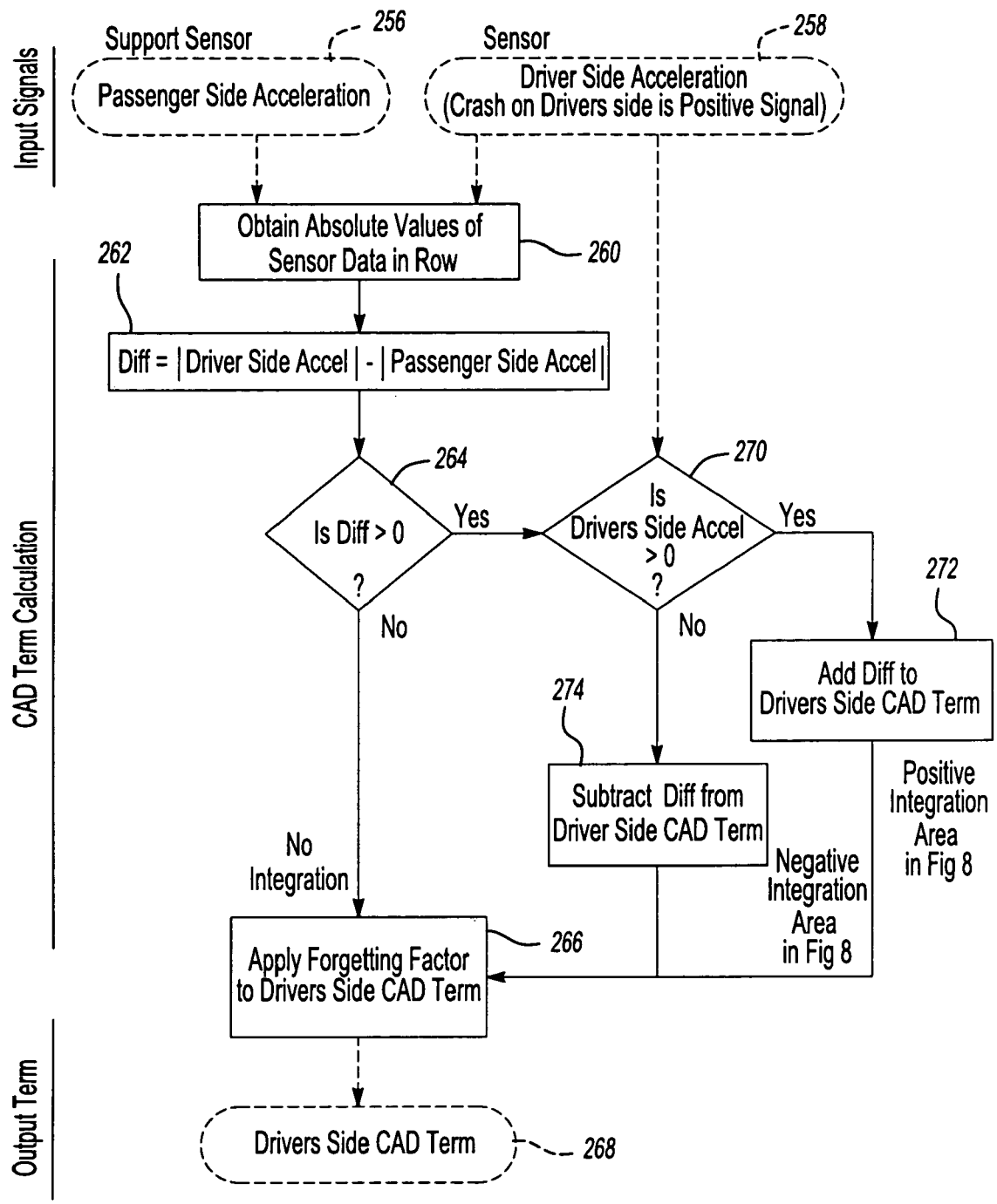
FIG. 7 is a flow diagram of a correlation acceleration difference (CAD) algorithm according to one embodiment of the invention.
Figure 8:
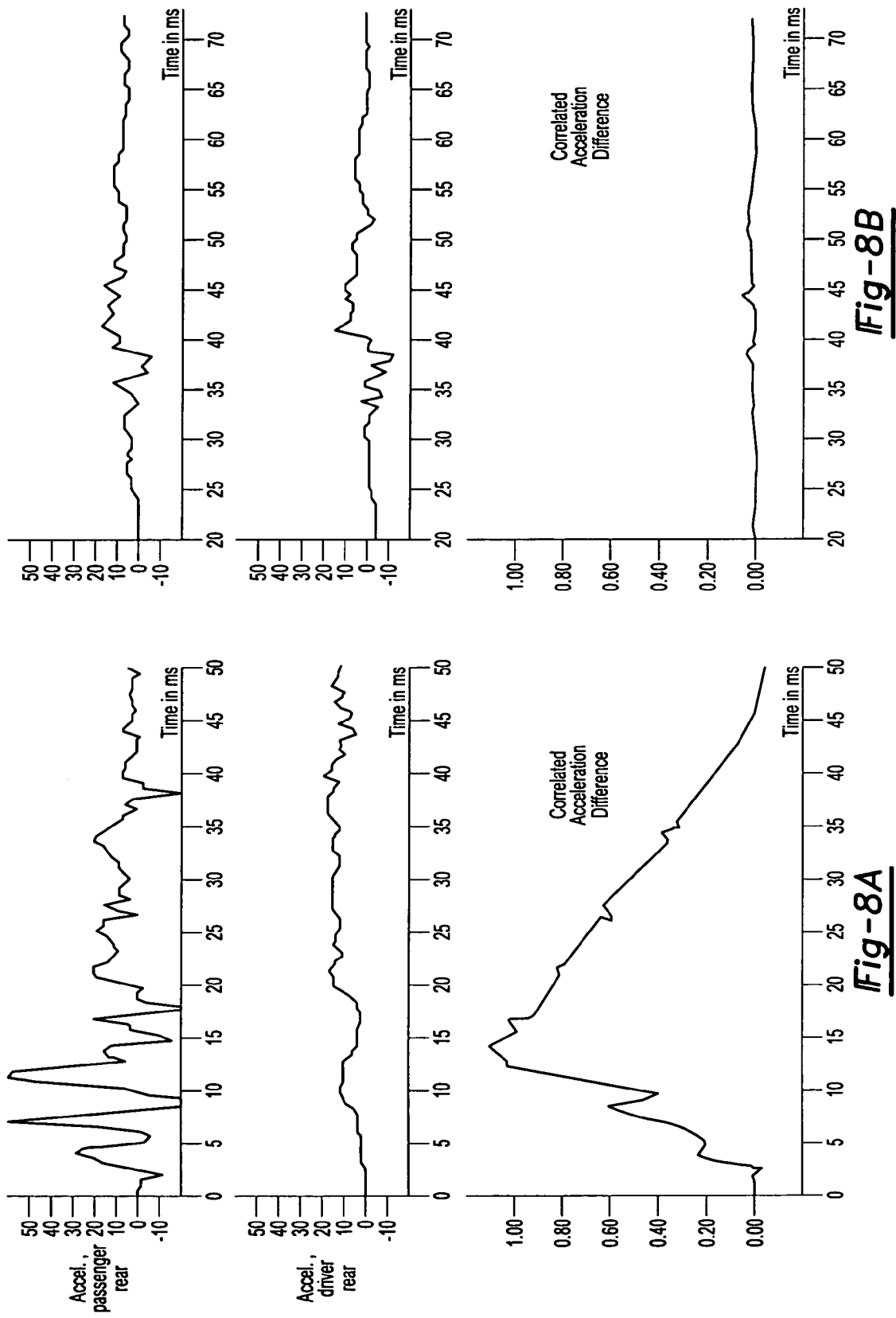
FIGS. 8A and 8B are two illustrative examples of CAD algorithm results.

FIG. 6 illustrates a method that reduces the likelihood of inadvertent restraint deployment due to undetectable transmission failures in a distributed sensing system. This method may be incorporated in, for example, a transmission check module 200 that is ANDed together with the fire/no-fire discrimination 120 so that the fire request 112 will be sent only when the transmission check module 200 indicates that the fire request 112 is based on valid transmitted data.

In many cases, a data transmission failure is detectable and the data in the failed transmission can be recovered via a redundant transmission. For example, a sync pulse ensures that the transmitted data is synchronous, a Manchester code improves performance and reliability, and a parity bit indicates if there is an internal sensor failure. The recovered data can then be evaluated by the sensor module 108 in the normal manner to decide whether to generate a fire request 112. However, these currently known precautions are unable to detect cases where, for example, data is corrupted through bit flips or other means. The transmission check module 200 is used to detect data transmission faults that would ordinarily go undetected by currently known methods. The transmission check module 200 provides an added degree of reliability in case all of these precautions fail to detect a faulty data transmission. If the transmission check module 200 indicates that the data is invalid, the transmission check module 200 prevents the sensor module 108 from sending a fire request or any other command that may influence the ultimate restraint deployment decision.

More particularly, if the transmission failure results in a flipped bit or some other anomaly (e.g., a momentarily high value in the data received by the sensor module 108), the sensor 102 may indicate to the sensor module 108 that its transmitted data contains an internal error by, for example, setting a most significant bit (MSB) in the data sample. As a result, the sensor 102 will still be able to transmit a signal, but the set MSB modifies the sensor module 108 to disable restraint deployment based on this signal to prevent the sensor module 108 from generating the fire request 112 based on the invalid data.

To provide an additional signal check inside the system and verify the plausibility of the data received from the sensors 102, the transmission check module 200 carries out the method shown in FIG. 6. Generally, the transmission check module 200 ensures that a selected number of consecutive sensor signals fall above a selected transmission check threshold during a given time window. If the detected sensor data is actually due to an anomaly (e.g., a single spike in the sensor data), it is far less likely that the anomaly will be repeated within the time window. More particularly, the sensor module 108 may periodically sample the data from its corresponding sensor 102 (block 201) to see whether any of the signals exceed a threshold indicating a possible crash (block 202). The transmission check module 200 may execute a transmission check each time the sensor module 108 receives a new data sample and/or each time the transmission check module is prompted to carry out a checking process.

If the sensor module 108 receives such a signal, the transmission check module 200 increments in an internal buffer counter 203 (block 204). The transmission check module 200 then checks whether the counter has reached a counter threshold (block 206). The counter threshold can be set to any value that is expected to reflect the characteristics of a crash event. In one embodiment, the transmission check module 200 checks the sensor module 108 response within a moving time window that progresses forward in time. Note that the counter may reset or decrement to a lower value as counter incrementing events fall outside the time window and/or if one data sample above the threshold is followed by another data sample that drops below the threshold (block 207).

If the counter does not reach the counter threshold within the time window, this indicates that the sensor signals exceeding the signal threshold are anomalies and likely to be caused by otherwise undetectable transmission errors rather than an actual crash. Thus, the transmission check module 200 leaves a transmission check flag unset, preventing the sensor module 108 from sending a fire request 112 even if the fire/no-fire discrimination 120 otherwise indicates that the sensor data has a profile matching that of a crash event. The sensor module 108 therefore continues to monitor the sensor data (block 201) as the time window moves forward.

If, however, the counter does reach the counter threshold within the time window, the transmission check modules sets a transmission check flag (block 210) indicating that the transmission check has been fulfilled. This allows the sensor module 108 to transmit the fire request 112 in response to the detected sensor data. The counter threshold itself may be selected via, for example, a statistical calculation of a probability corresponding to an acceptable number of fault signal transmissions.

This method separates the signal transmission check process from the actual sensing process, allowing the system 100 to avoid disabling sensors 102 while still preventing faulty sensor signals from affecting the deployment decision. By keeping sensors 102 active even if they send a faulty transmission, the method leaves open the possibility that the faulty transmission was a temporary event rather than due to a fault sensor. Further, the transmission check reduces the chances of inadvertent deployment by using a counter instead of single-decision logic, preventing a restraint from deploying until a sensor has indicated a crash event over a selected time period.

Correlation Acceleration Difference (CAD) Calculation

As explained above with respect to FIG. 5, the fire/no-fire discrimination 120 can be conducted by the sensor module 108 according to a second mode 124 that takes into account multiple terms to vary a dynamic threshold 150. By changing the dynamic threshold 150, the sensor module 108 can control the likelihood that the sensor output will cross the threshold at a given time.

One term that may be used to vary the dynamic threshold is a correlation acceleration difference (CAD). CAD is calculated in systems using acceleration sensors. The CAD term 250 may be calculated at key-on of the sensor module 108 and may be continuously updated during each algorithm cycle. An algorithm in the sensor module 108 calculates the CAD term 250, which corresponds to a degree of intrusion of a foreign object into the vehicle at a given time. The driver side and passenger side each have its own corresponding CAD term. Based on this information, the sensor module 108 can also discriminate between an object intrusion event from other types of events to influence the speed and degree to which the dynamic threshold 150 should be varied when considered with all the other terms used to calculate the dynamic threshold 150 (FIG. 5). The CAD term itself will always be greater than or equal to zero, and the value and weighting of the CAD term will dictate the amount of influence on the dynamic threshold 150. For example, if the CAD term 250 indicates that an object is intruding into the passenger compartment, the CAD term may adjust the dynamic threshold 150 to increase the likelihood that the sensor data will cause the sensor module 108 to generate a fire request 112 sooner. If the CAD term is zero, then its influence on the dynamic threshold will be zero as well.

Generally, the CAD term reflects the degree to which an absolute value of data from a sensor 102 on one side of the vehicle differs from data from a sensor 102 in a supporting location, such as an opposite location in the same row 252 (FIG. 1). Referring to FIGS. 7, 8A, 8B, and 9 calculating the CAD term 250 in this example involves obtaining sensor data reflecting a passenger side acceleration (block 256) and a driver side acceleration (block 258) in a given row, obtaining the absolute values of the sensor data in the row (block 260), and then subtracting the passenger side value from the driver side value to obtain a difference value (block 262). The difference value is then checked to see whether it is greater than zero (block 264).

Note that during normal vehicle operation, a sensor 102 in the front driver side will output data that is substantially the same as the data from a sensor 102 in the front passenger side (FIG. 8B). In practice, care should be taken during mounting to avoid any variations in the mounting positions of the sensors 102 in the vehicle, which may cause the sensors on the driver and passenger sides to deviate from perfect mirror images from each other, to ensure that the data from both sensors are evaluated from the same starting basis.

If an object hits the vehicle, one side of the vehicle will likely respond in a different manner than the other side, making sensors 102 in the same row respond differently (FIG. 8A). For example, if a pole hits the passenger side of the vehicle as shown in the illustrated example, the passenger side sensor 102 closest to the impact will respond by outputting a high-level data signal. However, the supporting sensor in the same row (e.g., a sensor in the driver side) will respond much differently because it is farther from the impact. As a result, the different sensor responses will cause the difference between the absolute values of the raw data from the corresponding driver and passenger side sensors to be different, generating a non-zero CAD term. Note that if the entire vehicle slides in response to a crash, the CAD term may be close to zero because the movement of the vehicle is likely to cause sensors on both sides of the vehicle to output similar readings; in this case, the CAD term has little to no influence over the dynamic threshold 150, requiring the dynamic threshold 150 to rely on other terms to detect the crash.

Referring back to FIG. 7, if the difference value is not greater than zero (block 264), no integration is conducted and a forgetting factor is applied to the driver side CAD term (block 266). The forgetting factor reduces the value of the final driver side CAD term by a selected amount (block 268) and therefore its influence on the dynamic threshold 150 calculation over time.

If the difference value is greater than zero, the sensor module 108 then checks whether the driver side acceleration term is greater than zero. If so, this indicates that there is more activity (e.g., impact activity) occurring on the driver side of the vehicle. The difference term is therefore added to the driver side CAD term (block 272), which corresponds with the positive integration area in FIG. 8. If the difference term is less than zero, the difference term is subtracted from the driver side CAD term (block 274). This ensures that no CAD integration occurs over time on purely oscillatory signals from the driver side sensor while the passenger side sensor has a zero-level signal. This may occur during, for example, misuse conditions like a sharp blow or a door slam on the driver side. A limit may be applied to set minimum and maximum values for the CAD term to avoid overflows that may cause unrealistic results.

Figure 9:
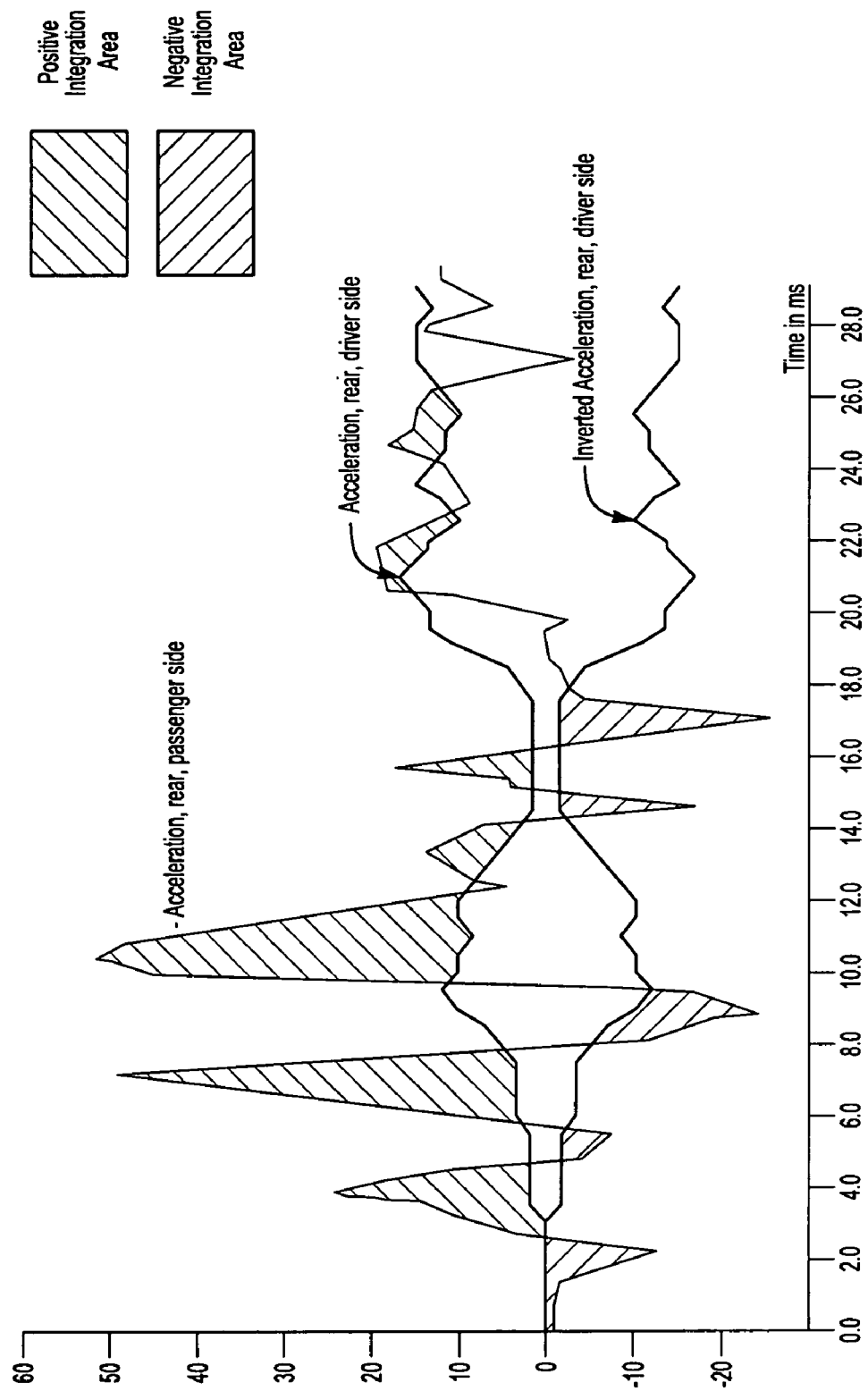
FIG. 9 is an illustrative graph showing results of an integration process in the CAD algorithm.

Once the driver side CAD term has been adjusted by the difference value (blocks 272 and 274), the forgetting factor is applied to the driver side CAD term (block 266) to obtain the final driver side CAD term (block 268). In one embodiment, the CAD algorithm applies the forgetting factor by integrating the difference term. As shown in FIG. 9, the integration may be a positive integration if the difference term is greater than zero and a negative integration if the difference term is less than zero. Note that the integration step filters out peaks in the sensor signals and provides information about the CAD term over time. This ensures that a deployment decision is based on sensor response over a selected time window and not on a single moment. It also filters out the influence of sensor responses during normal driving operation and eventually brings the CAD term back to zero after the sensors 102 sense a crash event or an anomaly during normal driving operation.

The sensor module 108 may then consider the CAD term, along with other terms, to modify the dynamic threshold 150. For example, if the CAD term is close to zero for an extended period of time and if other terms indicate that the vehicle is operating normally (FIG. 8B), the sensor module 108 may raise the dynamic threshold 150 to make the module 108 less sensitive and therefore less likely to send a fire request 112 at a given time. Conversely, if the CAD term is trending quickly toward a high level and if other terms indicate that a crash may be occurring (FIG. 8A), the sensor module may lower the dynamic threshold 150 to make the module 108 more sensitive, increasing the likelihood that the sensor 102 response will cross the threshold 150 sooner and trigger a fire request 112. The CAD term reflects the nature of the crash as well its existence, providing additional information for the dynamic threshold 150 to be customized to respond appropriately to the sensor responses.

Algorithm Runtime Reduction

Figure 10:
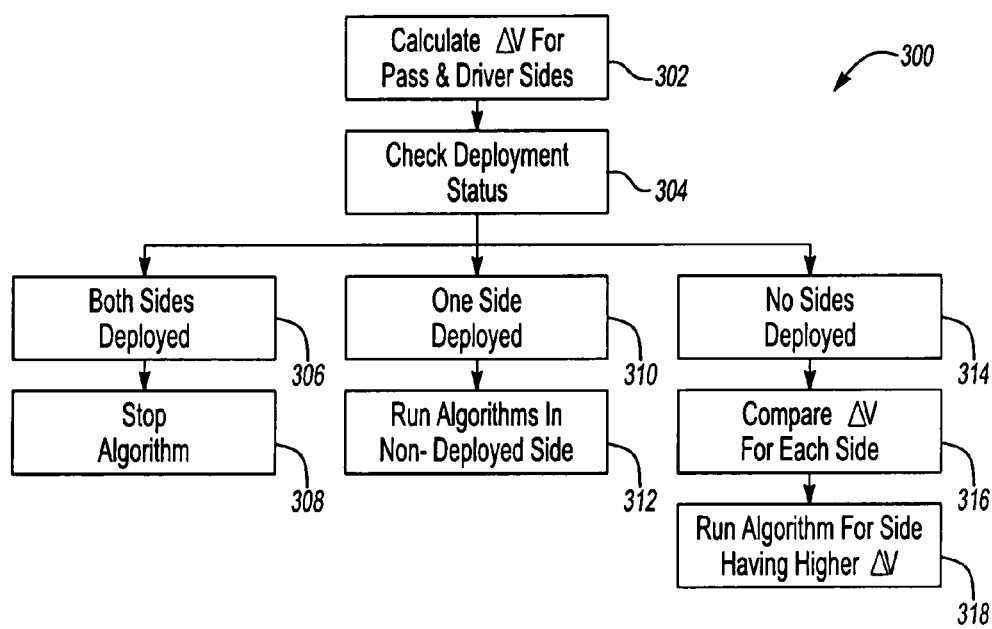
FIG. 10 is a flow diagram illustrating an algorithm runtime reduction method according to one embodiment of the invention.

FIG. 10 illustrates another embodiment of the invention directed to a method of reducing runtime in a restraint system algorithm. As noted above, the sensor modules 108 may consider outputs from sensors 102 other than the sensor 102 specifically associated with a given module 108. The CAD algorithm explained above and a plausibility check algorithm explained below, for example, may be calculated for each sensor 102 in the system. However, conducting this calculation and/or other calculations in every sensor 102 may strain limited system resources, particularly because all of the sensor modules 108 in the system 100 must share a finite amount of resources.

To improve system resources and reduce the burden of running algorithms in every sensor module 108 during every cycle, the method shown in FIG. 10 reduces the total number of calculations conducted by the overall system 100 by eliminating calculations that may be redundant and/or less likely to result in restraint deployment. Generally, the runtime reduction method 300 entails checking the velocity change ($\Delta V$) associated with each sensor 102 and running calculations only in the modules 108 on the side of the vehicle with the higher energy level $\Delta V$ in that cycle rather than running the algorithms symmetrically for both sides. Note that the side having the higher energy level may change from cycle to cycle; thus, for example, algorithms may be run only on the passenger side in one cycle and on the driver side in the next cycle.

In the method shown in FIG. 10, the controller 105 may first calculate the $\Delta V$ associated with each sensor 102 in the system 100 for both the driver and passenger sides (block 302). This step is optional and may be omitted if other selection criteria are used to select a side for running calculations.

The controller 105 then checks the deployment status of the restraints on each side of the vehicle (block 304). If the controller 105 detects that the restraints in both the driver and passenger sides have already been deployed (block 306), then the controller 105 knows that it does not need to conduct any further calculations because doing so would waste processing time and, at best, simply send a fire signal to already-deployed restraints. All deployment calculations are therefore stopped until the system 100 is reset (block 308).

If the controller 105 detects that the restraints on one side of the vehicle have been deployed (block 310), then the controller 105 runs the desired algorithms only in the sensor modules 108 on the non-deployed side (block 312). No firing calculations are conducted on the side having deployed restraints because doing so would be redundant and would, at best, send a fire signal to an already-deployed restraint. By shifting system resources only to the non-deployed side, the method 300 conserves system resources by shifting the available resources to avoid the possibility of refiring an already-deployed side.

If the controller 105 detects that neither side has deployed restraints even though the detected event is severe enough to warrant deployment (block 314), the controller 105 determines which side has the higher likelihood of requiring restraint deployment by comparing the ΔV or other selection criteria exhibited by the sensors on each side of the vehicle (block 316). For example, the controller 105 may select the side whose sensors 102 are exhibiting higher energy levels, higher velocities, or higher accelerations.

Once the controller 105 has selected the side having the higher selection criteria value, selected algorithm parts (e.g., a sum of terms for the dynamic threshold) are conducted on that side only for the current cycle (block 318). The process may then repeat for future cycles. In one embodiment, a full set of calculations (e.g., both a plausibility check and a fire/no-fire calculation) are conducted on the selected side while only basic calculations (e.g., plausibility calculation, velocity calculation) are conducted on the unselected side. By conducting a full set of calculations on only one side of the vehicle for a given row, the method in FIG. 10 can reduce the runtime of a deployment decision significantly during each cycle.

Note that sensors 102 in adjacent rows may exhibit different behaviors; thus, the controller 105 may calculate a separate runtime reduction process for the sensors in each row. As a result, the controller 105 may select the driver side in one row and the passenger side in another row during the same algorithm run cycle.

Event Plausibility Check

The event plausibility check provides a separate decision path for determining whether or not to deploy by incorporating the responses of more than one sensor into the determination. By basing a restraint deployment decision on outputs from more than one sensor, the plausibility check ensures that the deployment decision is not dictated by a single sensor output. This increases the confidence that a given deployment decision is due to an actual crash and not based on erroneous data.

As shown in FIG. 1, each sensor module 108 may conduct a plausibility check 110 that indicates whether one or more characteristics (e.g., the change in velocity ΔV) reflects the possibility that the vehicle is experiencing a crash. Generally, if the ΔV exceeds a selected plausibility threshold, it indicates that it is plausible that the sensor 102 is responding to an actual crash event. In other words, plausibility is indicated if an integral of absolute acceleration values over a selected time period exceeds a threshold. Note that different sensor modules 108 may have different plausibility thresholds, if desired, depending on, for example, vehicle hardware, vehicle setup, design requirements, etc.

Note that, as shown in FIG. 1, the plausibility check 110 is completely independent of the fire/no-fire discrimination 120 and does not involve the same algorithms even though both the plausibility check 110 and the fire/no-fire discrimination 120 are conducted on raw data from the sensors 102. In one embodiment, the threshold for fulfilling a plausibility check 110 is lower than the threshold for fire/no-fire discrimination 120 to indicate that the sensor data causes concern, but is not high enough to warrant sending the fire request 112. Note that like for all other decisions based on raw sensor data, the module 108 may filter the raw data with an offset to remove the effect of normal driving on the sensor data. The module 108 may, if desired, provide each sensor 102 with its own corresponding threshold. Further, a forgetting factor may also be associated with each sensor 102 so that the plausibility check reflects a continuously updated sensor response over a moving time window.

Figure 11:
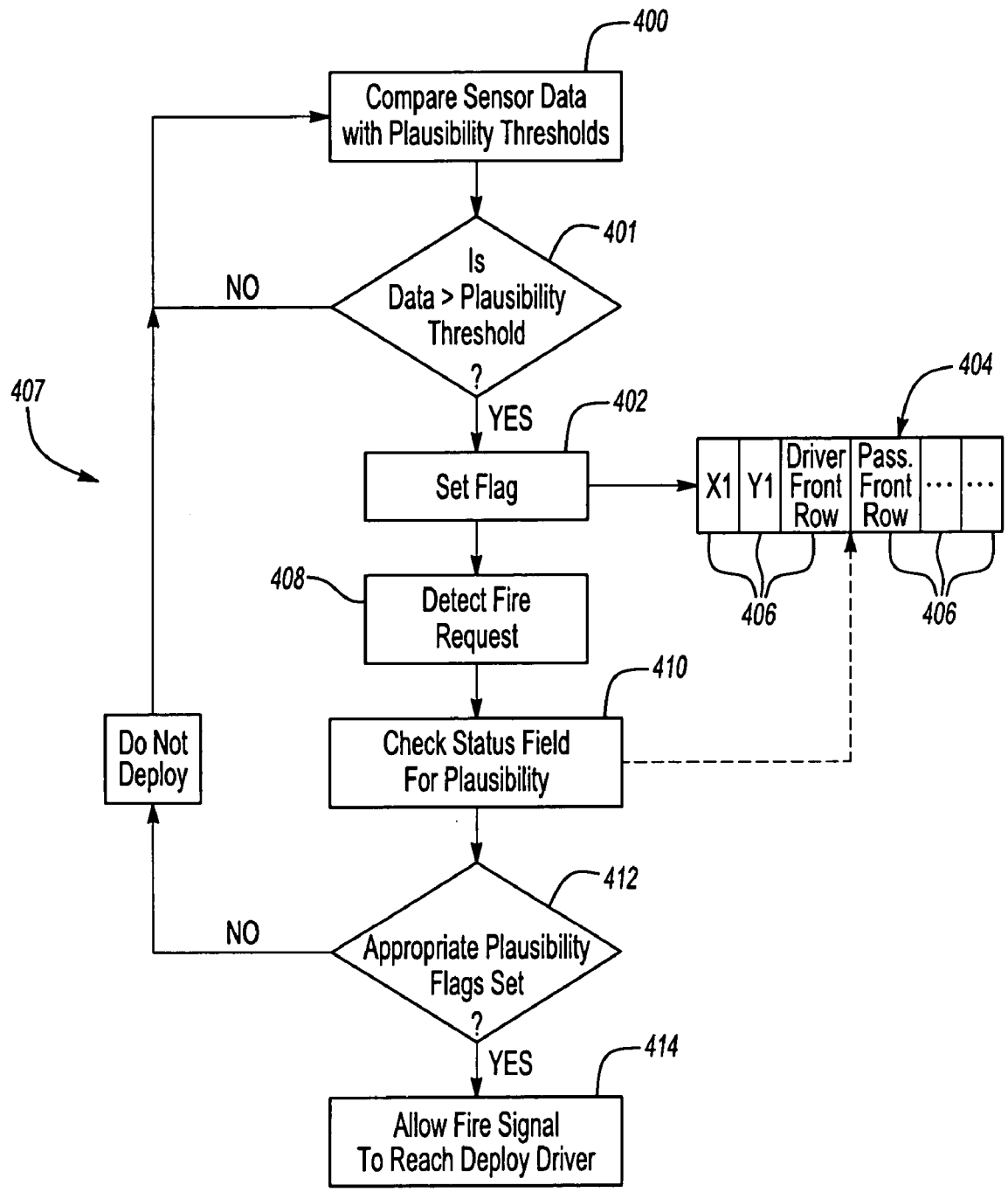
FIG. 11 is a flow diagram of a plausibility check according to one embodiment of the invention.

FIG. 11 illustrates one method in which a given sensor module 108 can conduct a plausibility check 110. Note that, as explained above, the plausibility determination and the fire/no-fire discrimination are independent from each other and may therefore be performed at different times during an algorithm run. During system operation, the sensor modules 108 continuously evaluate the data from their own corresponding sensors 102 according to their plausibility thresholds (block 400). If data from a given sensor 102 exceeds its corresponding plausibility threshold (block 401), it sets its plausibility flag (block 402).

In one embodiment, the system 100 includes a status field 404, such as a byte or word, that assigns a bit 406 for each sensor 102. If a given sensor module 108 determines that a crash is plausible after checking the incoming sensor data and conducting the plausibility calculations, it sets its assigned plausibility flag bit 406 to 1. The status field 404 is accessible by all of the sensor modules 108 for reference. Note that the status field 404 allows the plausibility determination to be technology-independent; that is, different types of sensors can be used to assist each other in deciding whether to deploy a restraint because the status field 404 is globally accessible by all sensors in the system. Data from both acceleration sensors and pressure sensors as well as other types of sensors may all be used to determine whether to set bits 406 in the status field 404.

The sensor module 108 for a given sensor 102 initiates a plausibility check process 407 when it detects that a fire request 112 has been generated (block 408). The fire request 112 does not result in restraint deployment, however, until the sensor module 108 also checks the status field 404 to see if any of the other sensors have set plausibility flags 406 (block 410). In one embodiment, the sensor module 108 checks only plausibility flags 406 corresponding to specific sensors 102. In other words, the specific plausibility check algorithm can vary from module to module depending on, for example, the location of the sensor corresponding to a given module, the type of event that the module wishes to detect, vehicle characteristics and requirements, etc. With respect to the illustrated example, each module 108a, 108b, 108c, and 108d may each have its own independent plausibility check whose operation is not dependent on or influenced by the plausibility checks in other modules. This ensures that the sensor module 108 conducts a deployment decision based on selected plausibility flags that make physical sense and correspond with other sensors that actually react along with the sensor generating the fire request 112 in a given crash event.

For example, a fire request 112 from one acceleration sensor may prompt checking of the plausibility flag corresponding to an opposing sensor. As another example, a fire request 112 from a driver side acceleration sensor may prompt checking of the plausibility flag corresponding to a driver side pressure sensor. In one embodiment, the specific plausibility flags that are watched and ignored by the central controller 105 during the plausibility determination can be selected by calibration (e.g., as an EEPROM parameter), forming a parameterable plausibility path.

Regardless of the specific algorithm used to conduct the plausibility check 110, the sensor module 108 that generated the firing request 112 should not be able to use its own plausibility flag 406 to render a deployment decision. This prevents the firing sensor from granting itself permission to deploy a restraint via the plausibility check 110. In other words, events detected by a sensor initiating a firing request 112 should be confirmed by at least one other sensor in the system 100.

If the plausibility check 110 conducted by the firing sensor indicates that there are a sufficient number of set plausibility flags in the memory location (block 412), indicating that the other sensors 102 have also detected a deployment-worthy event and grant permission to deploy, the central controller 105 sends a fire signal to the deployment device 106 to deploy a restraint (not shown) corresponding to the sensor module 108 sending the firing request 112 (block 414). If not, the fire request 112 is ignored (block 416) and the sensor data continues to be monitored with respect to a moving time window and compared with their corresponding plausibility thresholds (block 400).

It should be understood that various alternatives to the embodiments of the invention described herein may be employed in practicing the invention. It is intended that the following claims define the scope of the invention and that the method and apparatus within the scope of these claims and their equivalents be covered thereby.

What is claimed is:

1. A sensing system for a vehicle passenger restraint system, comprising:
    a plurality of sensors symmetrically arranged in at least one row, each row containing a driver side sensor and a passenger side sensor;
    a controller having a plurality of sensor modules, each sensor module corresponding to one of said plurality of sensors and generating a fire request that is considered by the controller in determining whether to generate the fire signal,
    said at least one sensor module containing
        a fire/no-fire discrimination algorithm used to decide whether to output a fire request,
        a plausibility check algorithm that controls a plausibility flag in a status field having a plurality of plausibility flags, wherein the plausibility flag for a given sensor is set if data from the sensor exceeds a plausibility threshold,
        a transmission check algorithm to check whether the sensor module is receiving valid sensor data from its corresponding sensor, wherein the transmission check algorithm comprises a counter that increments when the sensor data exceeds a transmission check threshold, and wherein the transmission check algorithm sets a transmission check flag used to determine whether to send the fire request when the counter reaches a counter threshold, and
        a correlation acceleration difference (CAD) algorithm that calculates a CAD term reflecting a difference between data from a driver side sensor and a passenger side sensor in one row,
    wherein the controller sends the fire signal if a first sensor sends a fire request and if a plausibility flag corresponding to a second sensor indicates that a crash event is plausible; and
    a deployment device that deploys a restraint in response to the fire signal.

2. The sensing system of claim 1, wherein the plurality of plausibility flags are in a parameterable plausibility path that allows calibration of said plurality of plausibility flags to include at least one of a watched plausibility flag and an ignored plausibility flag.

3. The sensing system of claim 1, wherein the second sensor is a sensor that has been predetermined to be likely to react with the first sensor in response to the crash event.

4. The sensing system of claim 1, wherein the fire/no-fire discrimination algorithm comprises:
    a first mode that evaluates a sensor output with respect to at least one threshold; and
    a second mode that evaluates a velocity change based on the sensor output with respect to a dynamic threshold that is variable based on a plurality of terms,
    wherein at least one of the first and second mode generate a fire request that is considered by the controller in determining whether to generate the fire signal.

5. The sensing system of claim 1, wherein the transmission check algorithm sets the transmission check flag when the counter reaches a counter threshold within a selected time window.

6. The sensing system of claim 1, wherein the CAD term is a difference between absolute values of driver side sensor data and passenger side sensor data integrated over a time window.

7. The sensing system of claim 1, wherein the controller checks a restraint deployment status on a driver side and a passenger side, and wherein the controller runs at least one algorithm in at least one sensor module on a non-deployed side if one of the driver and passenger sides have been deployed and stops at least one algorithm operation if both sides have been deployed.

8. The sensing system of claim 7, wherein the controller further compares a driver side velocity change and a passenger side velocity change and runs said at least one algorithm on the side having the higher velocity change.

* * * * *